Patented Feb. 14, 1933

1,897,189

UNITED STATES PATENT OFFICE

JAMES B. CROCKETT, OF MALDEN, MASSACHUSETTS

PREPARATION OF VULCANIZABLE LATEX

No Drawing.    Application filed November 22, 1930.   Serial No. 497,609.

This invention relates to the preparation of a vulcanizable latex, that is one which upon being subjected to drying out under the appropriate temperature conditions results in a vulcanized rubber coagulum. It relates more particularly to the preparation of a vulcanizable latex designed for use in the impregnation of articles which are dried out at sufficiently elevated temperature to lead to a product associated with rubber in vulcanized condition.

In using a latex containing added free sulphur for the impregnation of porous articles, difficulty is encountered even when as low as 1% sulphur based on latex solids is added to the latex as a vulcanizing agent, both because of the tendency of the sulphur toward subsidence and its tendency to filter out on the surface of the porous article especially when the usual flowers of sulphur is employed. In accordance with the present invention, I incorporate in the latex considerably more than 1% sulphur based on latex solids, as in the form of flowers of sulphur. Zinc oxide which is obtainable in such fine particle size as to give practically no subsiding trouble, such as may arise with flowers of sulphur, may also be added to the latex. I have found that when latex so treated is heated to temperatures insufficiently high to cause visible agglomeration of the rubber particles and is kept at such temperatures for a comparatively short period of time, about 1% of the sulphur based on latex solids tends to remain associated with the latex in a non-subsiding condition, whereas the rest of the sulphur tends to settle out together with some zinc oxide. It is my theory that either the rubber globules adsorb the amount of sulphur requisite for sulphur vulcanization or that this amount tends to remain colloidally suspended in the latex for an indefinite period of time. In any event, sulphur remains associated with the latex in such condition as to enable the latex to be stored even for weeks and then be used without running into trouble for the manufacture of impregnated articles. Films of rubber produced by drying out at room temperature latex treated with sulphur, in accordance with the present invention, are free from "blooming" or sulphur agglomerants visible to the naked eye even though such films showed no signs of vulcanization. Such films are markedly different from those obtained under similar conditions from a latex which contains free sulphur added in the usual manner, as in such latter case the films contain visible particles of sulphur especially on their surfaces.

After the subsidence of the excess sulphur and zinc oxide from the latex which is heated in accordance with my invention, the latex may be suitably separated from the sediment. It is to be remarked that no vulcanization whatever of the latex has thus far taken place, as the temperatures employed in the heat-treatment of the latex in the absence of an accelerator are far too low to cause any vulcanization whatever. The separated latex at room temperature or thereabouts is then preferably treated with an accelerator of vulcanization, but no appreciable vulcanization of the latex is effected because room temperature is too low to give rise to a vulcanizing reaction with the amounts and types of accelerators and the amount of suspended sulphur which I employ. When a bibulous structure is impregnated with the vulcanizable latex containing an accelerator of vulcanization and the impregnated structure is then dried out at the appropriate elevated temperature, the structure becomes combined with a vulcanized rubber coagulum. It is thus seen that the heat treatment to which the latex-impregnated structure is subjected may serve two ends, viz: first, the drying out of the structure accompanied by coagulation of the rubber; and, second, the vulcanization of the coagulated rubber or dried latex, although the drying out may be accomplished with little if any vulcanization of the rubber component, whereupon the rubber component may be vulcanized.

In carrying out the process of the present invention one may proceed more particularly as follows. The usual ammonia-preserved latex of commerce of a solids content of, say, 33% to 35% may be introduced as a batch into a mixing tank, preferably of the jacketed type. Into the batch of latex is then mixed a large excess of flowers of sulphur, by which I mean 4½% to 5%, or even more, sulphur based on latex solids, even though only about 1% sulphur is all that is necessary to secure the desired subsequent vulcanization. Any desired amount of finely divided zinc oxide, say 1% or more based on latex solids, may also be added to the batch. The batch is then raised in temperature, as by passing heated water through the jacket, to about 50° to 60° C., and these temperature conditions are maintained with slow stirring of the batch for about one hour. The batch is then permitted to remain in a quiescent state so as to promote the subsidence of such sulphur and zinc oxide having settling tendencies, during which settling period no heating medium is passed through the jacket and accordingly cooling of the batch to room temperature ensues. The latex may then be separated, as by decantation, from the sediment, whereupon it is preferably dosed with a small amount of a suitable accelerator of vulcanization, although in ordinary practice the accelerator of vulcanization may be added directly to the batch and the latex then separated from the sediment, as in such case the treatment of the latex from start to finish is made possible in a single container. After separation from the sediment, the latex contains about 1% sulphur, as previously indicated. The accelerator of vulcanization employed may be an ultra-accelerator, for instance, piperidine piperidyl dithocarbamate or the compound known as "pipsol", a reaction product of carbon bisulphide and methylene dipiperidine. Other accelerators, such as mercaptobenzothiazole, tetra-methylthiuram bisulphide or di-phenyl guanidine, or mixtures of the same, are also suitable. In any case, however, the amount and type of accelerator employed are adjusted to make possible the achievement of the results desired.

The latex thus treated undergoes practically no vulcanization at room temperature even if it is kept for an indefinite period of time. It is especially fitted for the impregnation of porous objects or foundations, for instance, bibulous webs or waterleaf papers of interfelted cellulose fiber capable of yielding a finished sheet material suitable for use as artificial leather. When a latex-impregnated web or paper is dried out at sufficiently elevated temperature, say about 100° C. or higher, to promote vulcanization of the rubber coagulated in the web, the resulting sheet is characterized not only by its dry or non-tacky feel, but further by the strength and toughness qualities imparted thereto by the vulcanized rubber component. By the term "impregnation," I mean to include the various degrees of penetration of the latex into a porous foundation, namely, a penetration clear through the foundation, as when a bibulous web is dipped into a bath of latex in producing artificial leather, or a mere surface penetration of the latex into the foundation, as when a bibulous web is coated with the latex in imparting a water-resistant surface to the web. In either case elimination of the water from the foundation may be accomplished, in accordance with the present invention, under sufficient heat to vulcanize the rubber component, although, as already indicated, the drying of the foundation may be carried out at below vulcanizing temperatures and the dried foundation then subjected to vulcanizing temperatures.

The specific example hereinbefore given for effecting the treatment of latex admits of considerable variation while falling within the purview of the present invention. Thus the solids content of the latex used as a raw material may vary, say from 25% to 45%, but in any case the initial treatment of the latex with sulphur is conducted under such time and temperature factors as to avoid visible agglomeration or flocculation of rubber as well as accompanying undue thickening or increase in viscosity of the latex. In the case of a latex of 40% solids content which has been treated with sulphur, the maintenance of the treated latex at a temperature of 40° C. for one-half hour may constitute a heat-treatment falling in line with the principles of the present invention, whereas a latex of 25% solids content which has been treated with sulphur may, in accordance with my invention, require subjection for one hour at 70° C. The particular temperature of heating chosen with a given latex should be the highest temperature consistent with a positive preservation of the latex substantially devoid of visible rubber flocs or agglomerations, as this makes for a minimum time of treatment. Latices of relatively high concentrations call for a shorter time and lower temperature of treatment than latices of relatively low concentrations, assuming that both varieties of the latices are of the same stability, as the factor of stability must also be considered in fixing upon a time and temperature of treatment. A criterion for fixing time and temperature of treatment is the attainment in the latex of an end-point viscosity which does not prevent the subsidence of the excess sulphur added to the latex. In the case of a latex of normal solids content (33% to 35%) or lower, there may be considerable latitude of time and temperature factors in carrying out the heat treatment, for even if there is a slight increase in viscosity of the latex over the initial viscosity, as there usually is, the end-point viscosity is still far above that which precludes the settling out of excess sulphur and zinc oxide; but in the case of a more concentrated and viscous latex (40% to 50% solids content) one should guard carefully against over-stepping a viscosity which retards greatly the subsidence of excess sulphur and zinc oxide. The inevitable slight increase in the viscosity of a latex of normal solids content is usually desirable, as this is accompanied by a faster setting of the rubber in the impregnated product as well as a diminished tendency for the rubber globules to migrate to the surface of the product along with the water being carried by diffusion to the surface for evaporation. It is possible that this same increase in viscosity of the latex retards subsidence of the sulphur, or it may be this factor of retardation together with those previously advanced as hypotheses for explaining the non-subsiding state of some of the sulphur. I am using the term "latex" in the specification and in the appended claims in its comprehensive sense to include not only the natural latices derived from the rubber tree and preserved as with ammonia, but also artificial latices or aqueous dispersions of rubber.

An important advantage of my process is that I am enabled to produce in a comparatively short period of time an eminently satisfactory vulcanizable latex whose added ingredients, including sulphur, zinc oxide and accelerator of vulcanization, are present therein in a substantially non-subsiding state, and whose rubber content becomes vulcanized when, for instance, porous articles impregnated therewith are dried at elevated temperatures. The practice of my latex-treating steps requires only open tanks whose rate of production for a given tank capacity is much higher than that attainable in processes which are intended to accomplish a vulcanization of the latex. Again, in accordance with my invention, there is no danger of spoilage through coagulation as there are in processes designed to effect the vulcanization of latex, as in such latter processes the latex tends to coagulate, because of the higher temperatures and more prolonged heating necessary to effect vulcanization, and is apt to be less stable, once vulcanized.

What I claim is:

1. A process which comprises adding to latex considerably more than about 1% flowers of sulphur based on latex solids, and heating the latex while maintaining it in substantially unvulcanized condition and substantially free from visible agglomerations of rubber particles to associate some of the sulphur in a non-subsiding state with the latex.

2. A process which comprises adding to latex considerably more than about 1% sulphur based on latex solids, heating the latex while maintaining it in substantially unvulcanized condition and substantially free from visible agglomerations of rubber particles to associate some of the sulphur in a non-subsiding state with the latex, permitting the rest of the sulphur to settle out, and separating the latex from the sediment.

3. A process which comprises adding to latex considerably more than about 1% sulphur based on latex solids, heating the latex while maintaining it substantially free from visible agglomerations of rubber particles to associate some of the sulphur in a non-subsiding state with the latex, permitting the rest of the sulphur to settle out and the cooling of the latex to about room temperature, and adding an accelerator of vulcanization to the cooled latex.

4. A vulcanizable latex containing free sulphur added thereto as flowers of sulphur, substantially all of said sulphur being associated with said latex in a non-subsiding state and said latex containing substantially only those protective colloids naturally occurring therein.

5. A vulcanizable latex containing free sulphur added thereto as flowers of sulphur, and zinc oxide, substantially all of said sulphur and zinc oxide being associated with said latex in a non-subsiding state and said latex containing substantially only those protective colloids naturally occurring therein.

6. A vulcanizable latex containing associated therewith in a non-subsiding state at least about 1% free sulphur added thereto as flowers of sulphur, zinc oxide, and an accelerator of vulcanization, said latex containing substantially only those protective colloids naturally occurring therein.

In testimony whereof I have affixed my signature.

JAMES B. CROCKETT.